United States Patent
Viertel et al.

[11] Patent Number: 5,498,056
[45] Date of Patent: Mar. 12, 1996

[54] SUN VISOR FOR MOTOR VEHICLES

[75] Inventors: Lothar Viertel, Altforweiler, Germany; Patrick Welter, La Chambre, France

[73] Assignee: Gebr. Happich GmbH, Germany

[21] Appl. No.: 333,047

[22] Filed: Nov. 1, 1994

[30] Foreign Application Priority Data

Nov. 5, 1993 [DE] Germany .............. 43 37 808.0

[51] Int. Cl.$^6$ ...................................... B60J 3/00
[52] U.S. Cl. ................ 296/97.5; 296/97.9; 362/93.1
[58] Field of Search ................... 296/97.1, 97.9, 296/97.12, 97.5; 362/83.1, 135

[56] References Cited

U.S. PATENT DOCUMENTS

| | | |
|---|---|---|
| 4,174,864 | 11/1979 | Viertel et al. . |
| 5,004,288 | 4/1991 | Viertel et al. . |
| 5,011,212 | 4/1991 | Viertel et al. . |
| 5,374,097 | 12/1994 | George et al. ............... 296/97.9 X |

FOREIGN PATENT DOCUMENTS

| | | |
|---|---|---|
| 0344135 | 11/1989 | European Pat. Off. . |
| 3711570 | 10/1988 | Germany . |
| 3838117 | 5/1990 | Germany . |
| 3842705 | 6/1990 | Germany . |
| 3916560 | 11/1990 | Germany . |

*Primary Examiner*—Joseph D. Pape
*Attorney, Agent, or Firm*—Ostrolenk, Faber, Gerb & Soffen

[57] ABSTRACT

A sun visor has a sun visor body and an L-shaped visor body support shaft. A first arm of the shaft is received in a bearing bracket. A second arm of the shaft extends along a first longitudinal edge of the visor body. The first longitudinal edge of the body has a step shaped offset defining a free space at the end thereof toward the first support shaft arm. The support shaft second arm is perpendicular to the first arm and extending across the free space. The second arm has a free end region which extends into a mounting hole defined in the visor body and toward one longitudinal end. In the free space defined by the step shaped offset and into the first longitudinal edge of the visor body, an illuminating device is supported by a housing attached to the second shaft arm. The second shaft arm extends across the free space and into the mounting hole in the visor body.

18 Claims, 3 Drawing Sheets

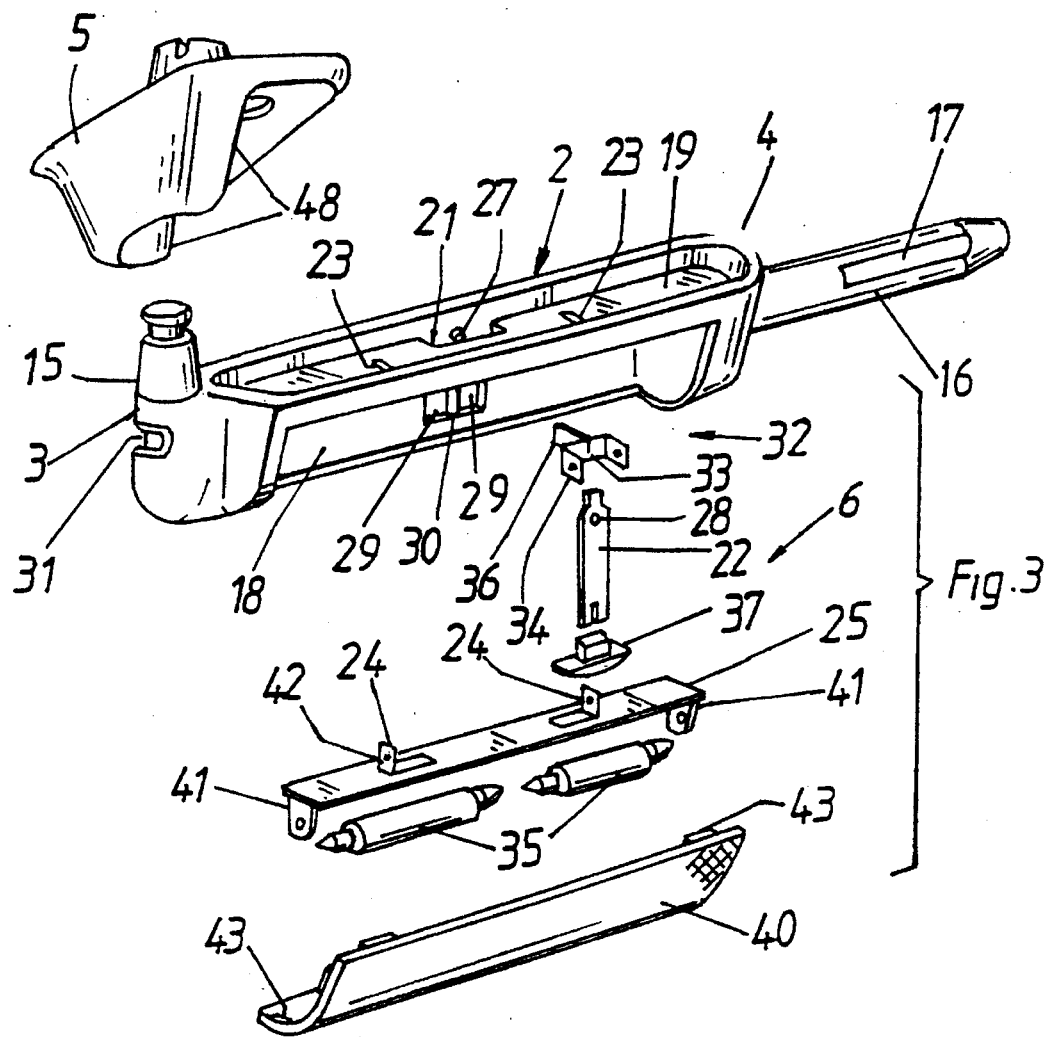
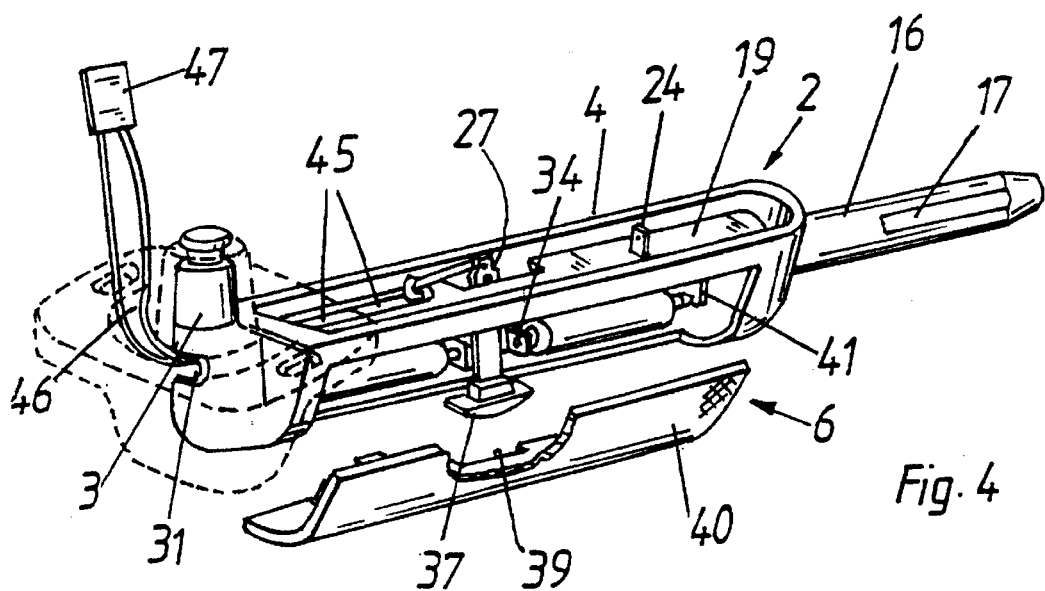

5,498,056

SUN VISOR FOR MOTOR VEHICLES

BACKGROUND OF THE INVENTION

The present invention relates to a sun visor for motor vehicles having a sun-visor body, an illuminating device, and an L-shaped support shaft. The first shaft arm of the support shaft is directed approximately vertically in its installed position and is mounted in a bearing bracket which has been fastened to the body of the vehicle. The second shaft arm of the support shaft is directed approximately horizontally in its installed position. Its free end region engages into a support hole which is provided in the region of a longitudinal edge of the sun-visor body and that shaft arm extends parallel to the longitudinal edge.

A sun visor of this type is disclosed in Federal Republic of Germany 27 03 447 C3. In this known sun visor, there is an illuminating device associated with the sun visor body such that the electrical connecting and contacting elements are also arranged in the sun visor body. This causes the manufacture of the sun visor to be relatively cumbersome and expensive. Furthermore, the sun visor body must be made relatively thick, usually contrary to the wishes of the customers, because an illuminating device cannot otherwise be arranged in it. The sun visor body of the traditional sun visor is heavy due to the illuminating device which is installed in it, so that it cannot be dependably supported by a single support shaft alone. The known sun visor is therefore equipped with an outer support pin, which then makes it necessary to provide a separate outer support bracket on the vehicle. An illuminating device installed in the sun visor body of the traditional sun visor, however, not only increases its cost of manufacture it, in addition, makes recycling the visor difficult.

SUMMARY OF THE INVENTION

The object of the present invention is to make manufacture of the sun visor easier, at lower cost and in a manner which eases its assembly, makes it stylistically attractive, and easier and simpler to recycle.

According to the invention, the second shaft arm of the support shaft is developed as a housing which is equipped with the illuminating device except that the illuminating device does not extend over the free end region of the second arm which engages into the mounting hole of the sun visor body. On its longitudinal edge the sun visor body has a step wise offset which defines a free space for the housing of the illumination device, and where the edge is not offset, the edge region receives the free end region of the second shaft arm. The mounting hole of the sun visor body for receiving the free end region of the second shaft arm extends from the end wall of the step shaped offset.

Considerable advantages are obtained with the invention. By integrating the illuminating device in the sun visor support shaft, the sun visor body can be made extremely thin. The sun visor body need merely be provided with a removable detent spring which acts on the free end region of the second shaft arm to control visor body pivoting. The body may have a holding member for the detent spring. On the other hand, expensive insert or reinforcing elements are no longer included in the visor body. Furthermore, the sun visor body can be provided with a make-up mirror. The support of the sun visor body is shifted toward the longitudinal center, with respect to the end of the sun visor body. This reduces the lever arm of the visor body and makes it possible to do without an outer support pin and without the manufacture and mounting of a separate outer support bracket. Manufacturing cost of the sun visor is to this extent also substantially reduced.

The step-wise offsetting of the upper longitudinal edge of the sun-visor body creates a free space which is filled by the housing part of the illumination device on the support shaft. This provides a stylistically attractive overall design for the sun visor. Another advantage is that the illuminating device can be used regardless of whether the sun visor body is in its position of use or in its position of nonuse. This enables the illuminating device to be used both as a reading light and in conjunction with the use of the mirror in the dark.

Other features and advantages of the present invention will become apparent from the following description of the invention which refers to the accompanying drawings.

BRIEF DESCRIPTION OF THE DRAWINGS

One embodiment of the invention is explained below with reference to the drawings, in which

FIG. 3 is an exploded view in perspective of the support shaft together with the illuminating device and the mounting bracket;

FIG. 4 shows the support shaft together with individual parts of FIG. 3 in assembled condition.

DETAILED DESCRIPTION OF EMBODIMENTS OF THE INVENTION

Figure 1:
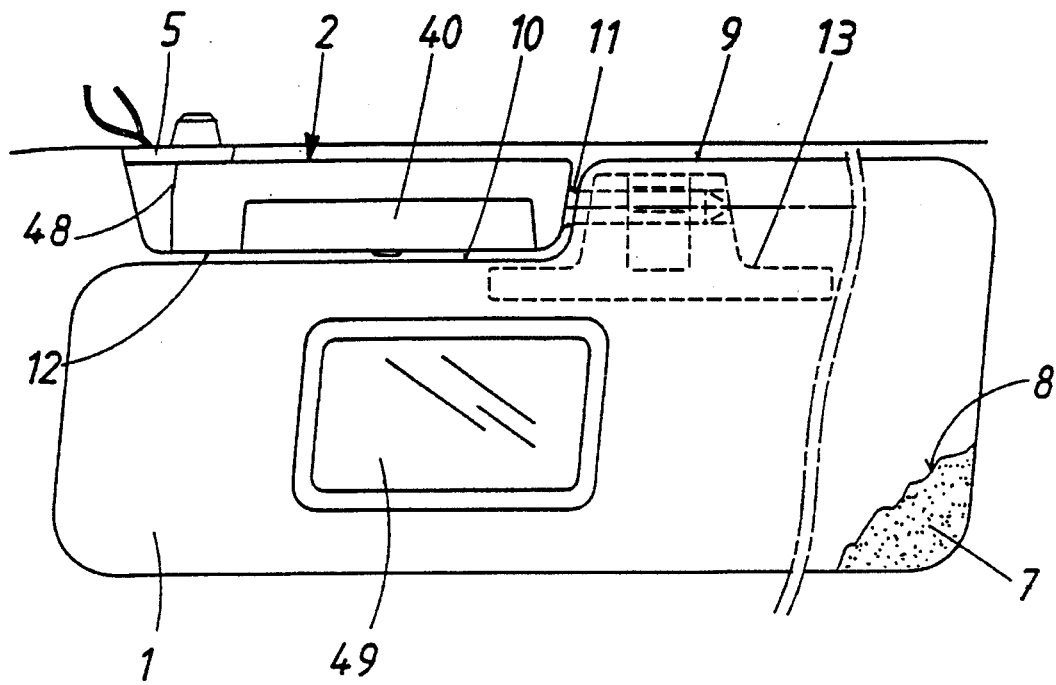
FIG. 1 is an elevational view of a sun visor body in its position of use.
Figure 2:
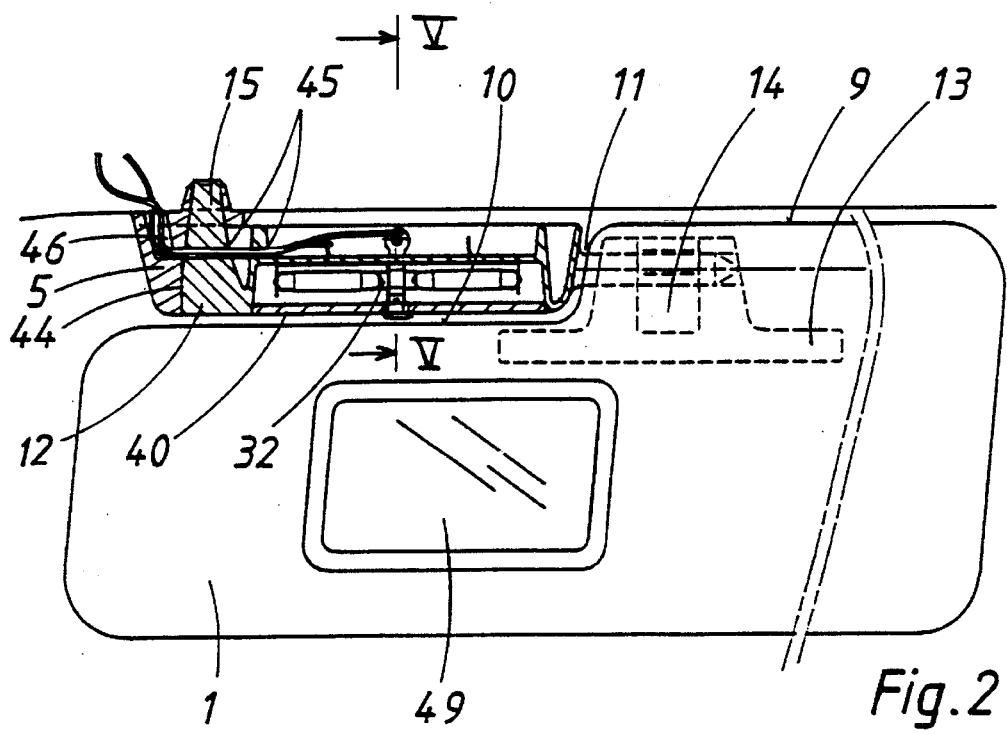
FIG. 2 is a view of the sun visor body of FIG. 1, but with the support shaft shown in a vertical longitudinal section.
Figure 5:
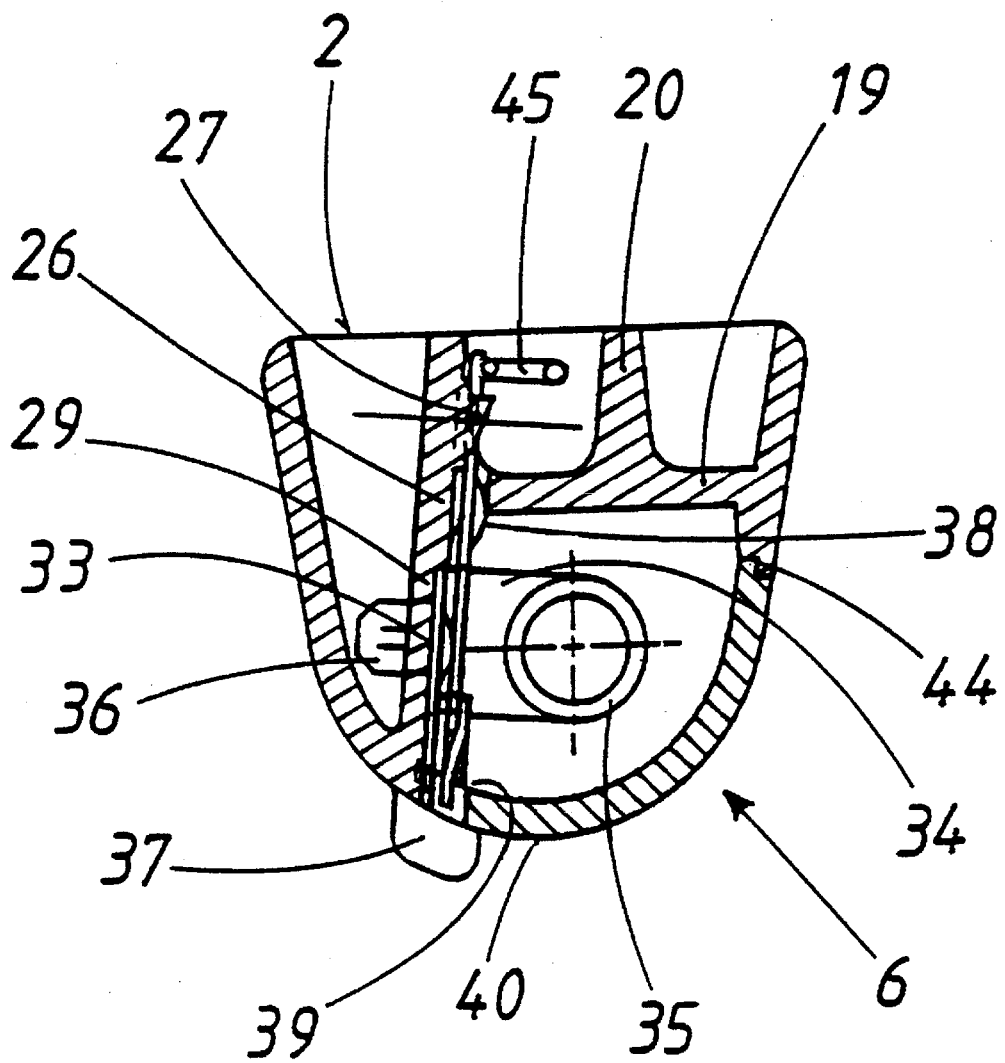
FIG. 5 is a section along the line V—V of FIG. 2.

The sun visor of the invention comprises essentially a sun visor body 1, an L-shaped support shaft 2 having a first, vertical shaft arm 3 and a second horizontal shaft arm 4, which is perpendicular to the first arm, a mounting bracket 5 at the vehicle roof which swingably receives the vertical shaft arm 3, and an illuminating device 6.

The sun visor body 1 is preferably made of polypropylene particles 7 and is wrapped by a sheet 8 of TPO. The upper longitudinal edge 9 of the sun visor body 1 has a step shaped, here depressed, offset 10 with an end wall 11, which forms a free space 12 above the longitudinal edge in the offset region. A mounting hole extends inside the sun visor body 1 from the end wall 11. That hole is directed approximately parallel to the upper longitudinal edge 9. The mounting hole is formed in part of its region in an insert body 13 which is embedded in the sun visor body 1 and the insert body is provided with a detent spring 14.

The free end region of the vertical shaft arm 3 of the support shaft 2 is developed to include a cone 15 which sits in the correspondingly shaped mounting hole of the mounting bracket 5. The free end of the cone 15 has a mushroom head for producing a clip attachment between the mounting shaft and the bearing bracket 5.

The horizontal shaft arm 4 of the support shaft 2 has a free end region 16 which engages into the mounting hole of the sun visor body. The circular circumference of the end region 16 is interrupted by a flat 17. The flat 17 cooperates with the detent spring 14 to define an end detent position for the sun visor body 1 in its position of nonuse against the ceiling of the car. Except for its free end region 16 which engages into the mounting hole of the sun visor body, the horizontal shaft arm 4 is developed as a housing 18 which is provided with the illuminating device 6. Furthermore, the entire support shaft 2 is developed as a one piece plastic injection molding.

The housing 18 is divided by a horizontal partition 19 into an upper housing part and a lower housing part. In order to increase the stability, stabilizing webs 20 are provided on the partition 19. The horizontal partition 19 has an opening 21 for access to a switch element 22 of the illuminating device 6, and has slots 23 for permitting the passage of sheet metal tongues of a contact plate 25. A vertically directed housing partition 26 includes a journal pin 27 formed on it, which is gripped over by the mounting hole 28 of the switch element 22. Approximately at its center, the housing partition 26 has depressions 29 as well as a slot opening 30 between the depressions 29. A passage hole 31 passes through the vertical shaft arm 3 and debouches in the upper region of the housing. It permits the passage of cables 45 to the electric current supply of the illuminating device 6.

The illuminating device 6 includes a U-shaped contact plate 32 which is developed, on the left and right, with elevated contact zones 33, erect receiving tongues 34 for the tubular bulbs 35, and a rear fastening web 36. The contact plate 32 is inserted into the depressions 29. The attachment web 36 passes through the slot opening 30. A firm seat is assured by claws on the fastening web 36. The switch element 22 bears an actuating knob 37 at its lower end. The switch element, can be contacted with the contact zones 33 of the contact plate 32. Unintentional switching is avoided by a stamped zone 38 which rests against a wall of the opening 21 and by the actuating knob 37 in the slot 39 of the light window 40.

The illuminating device furthermore includes the contact plate 25 with the bent off receiving tongues 41 for the light tubes 35. The erect sheet metal tongues 24 with erect claws 42 which are formed and set up on the contact plate 25 are pressed into the slots 23 in the partition 19. The light tubes 35 can then be clamped between the receiving tongues 34 and 41. The region of the housing which is open toward the front can then be closed by the light window 40. The clip tongues 43 developed on the light window 40 clip in position and are held in the region 44 developed for this on the housing 18.

After the support shaft 2 is connected with the bearing bracket 5, due to its special shaping, it forms a linear support 44. This imparts sufficient stability to be able to take up any moments of bending force which may occur. The support 44 forms a practical replacement for an outer support.

The two electric wires or cables 45 are adapted to be pushed through the passage hole 31 and through the free region provided in the bearing bracket 5 and into the upper housing part. The ends of the cable are then connected, on the one hand, with the switch element 32 and, on the other hand, with one of the sheet metal tongues 24 of the contact plate 25, in particular by soldering. The other cable ends are spaced from the sun visor and are preferably provided with a contact plug 47.

The sun visor body 1 can, on the one hand, be swung around the pin 16 toward the windshield or toward the ceiling of a car. The sun visor body 1 can furthermore be swung to the side, so as then to be located in front of a side window. In this connection, the cables 45 can move freely without danger of contact, due to the free space 46 that is formed in the bearing bracket 5. Excessive swinging toward the side window or the windshield is not possible since swing limiting stops 48 are present on the bearing bracket 5 and on the support shaft 2.

The sun visor body 1 is provided with a make-up mirror 49 mounted in a frame. The make-up mirror 49 is preferably seated in a depression in the sun-visor body 1.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A sun visor for motor vehicles comprising:
   a sun visor body, the body having a first longitudinal edge, a mounting hole in the sun visor body and extending generally parallel to the longitudinal edge of the visor body;
   at the first longitudinal edge, the sun visor body including a step offset, so that the portion of the visor body in which the mounting hole is disposed extends less than the entire length of the first longitudinal edge of the visor body, for defining a free space at the offset which communicates to the mounting hole in the visor body;
   an L-shaped support shaft for the visor body, the shaft including a first shaft arm which is insertable into a mounting bracket on the body of the vehicle and a second shaft arm which meets the first shaft arm, the second shaft arm being of sufficient length that it extends across the free space defined by the step offset of the first longitudinal edge of the visor body, and the second shaft arm having a free end region which extends into the mounting hole of the visor body;
   an illuminating device disposed at the second shaft arm in the free space defined by the step offset of the first longitudinal edge of the visor body.

2. The sun visor of claim 1, wherein the first shaft arm is generally at an end of the first longitudinal edge of the visor body and extends approximately vertically upward from the first longitudinal edge, and the second shaft arm is generally perpendicular to the first shaft arm and extends approximately horizontally.

3. The sun visor of claim 1, wherein the sun visor body and the offset are so shaped that the visor body has an end wall at the end of the offset past the free space and the mounting hole for the second shaft arm passing through the end wall of the offset, such that the end region of the second shaft arm extends through the end wall of the offset into the mounting hole.

4. The sun visor of claim 3, wherein the offset region of the first longitudinal edge comprises a step inward from the first longitudinal edge of the visor body.

5. The sun visor of claim 3, wherein the illuminating device includes a housing and illuminating means is disposed in the housing and the housing is located at the second shaft arm in the free space.

6. The sun visor of claim 5, wherein the housing for the illuminating device is of one piece with the second shaft arm of the support shaft.

7. The sun visor of claim 6, wherein the housing of the illuminating device is of the same material as the support shaft.

8. The sun visor of claim 7, wherein the housing and the support shaft are of an injection molded plastic.

9. The sun visor of claim 5, wherein the housing has an upper housing part generally facing away from the visor body and a lower housing part facing toward the visor body and a partition extending substantially horizontally in the housing separating the upper and lower housing parts.

10. The sun visor of claim 9, further comprising a hole for the passage of electric connecting lines and extending through the first shaft arm of the support shaft and communicating into the upper housing part.

11. The sun visor of claim 9, wherein the illuminating means is disposed in the lower housing part.

12. The sun visor of claim 11, wherein the lower housing part has a front opening and a light window installed in the front opening for permitting the light from the illuminating means to shine through.

13. The sun visor of claim 10, further comprising a bearing bracket which grips over the first shaft arm of the support shaft, means in the bearing bracket for permitting the passage of electric connecting lines through the hole in the first shaft arm.

14. The sun visor of claim 13, wherein the means in the bearing bracket comprises a recessed, radially widened free region for permitting the passage of the electric connecting lines.

15. The sun visor of claim 13, further comprises swing path limiting stops defined on the bearing bracket.

16. The sun visor of claim 11, further comprising a switch for the illuminating means connected with the illuminating means and supported on the housing for being operable with respect to the housing for turning on and off the illuminating means.

17. A sun visor for motor vehicles comprising:

a sun visor body, the body having a first longitudinal edge, a mounting hole in the sun visor body and extending generally parallel to the longitudinal edge of the visor body; at the first longitudinal edge, the sun visor body being shaped to define a free space over part of the length of the longitudinal edge and the free space communicating to the mounting hole in the visor body;

an L-shaped support shaft for the visor body, the shaft including a first shaft arm which is insertable into a mounting bracket on the body of the vehicle and a second shaft arm which meets the first shaft arm, the second shaft arm being of sufficient length that it extends across the free space, and the second shaft arm having a free end region which extends into the mounting hole of the visor body;

an illuminating device disposed at the second shaft arm in the free space defined by the step offset of the first longitudinal edge of the visor body.

18. The sun visor of claim 17 wherein the illuminating device includes a housing and illuminating means is disposed in the housing and the housing is located at the second shaft arm in the free space.

* * * * *